April 23, 1963 D. F. CROZAT ETAL 3,086,213
WELDING HELMET
Filed Nov. 30, 1960

INVENTORS
DONALD F. CROZAT
HAROLD R. HACKBARTH
BY
Elliott & Pastoriza
ATTORNEYS

United States Patent Office 3,086,213
Patented Apr. 23, 1963

3,086,213
WELDING HELMET
Donald F. Crozat, Santa Monica, and Harold R. Hackbarth, Los Angeles, Calif., assignors to Auto-View Welding Helmet Company, a corporation of California
Filed Nov. 30, 1960, Ser. No. 72,757
4 Claims. (Cl. 2—8)

This invention relates generally to protective hoods and more particularly to an improved welding helmet incorporating a mechanism for moving the light filtering eye shield from the line of vision of the wearer to enable inspection of a work.

Present-day welding helmets include light filtering eye shields usually in the form of several layers of colored glass to protect the welder's eyes from their work. Ordinarily the hood is pivoted to a headband support so that it may be readily swung back to move the eye shield from the line of vision and enable the welder to inspect the weld periodically. This action requires the use of one of the welder's hands, resulting in inconvenience, wasted motion, and lost time, since one or more of the welding tools must be set aside in order to free the hand.

One solution proposed for this problem is to provide a mechanical mechanism within the welding hood adapted to be actuated by a chin rest for moving aside the light filtering eye shield when clear vision is desired. There are three important considerations in the design of such a welding helmet. First, such a mechanism should be designed in a manner to avoid cluttering the inside of the welding hood with the actuating apparatus as otherwise the hood may be prevented from swinging to an upward position. Second, it is important that the eye shield means be moved completely out of the line of vision of the wearer with relatively little movement of the chin since a more positive muscle control in movement of the chin is realizable over a small distance as compared with a relatively large distance. Third, and of considerable importance, the eye shield itself and the manner of movement thereof must be such as to provide a substantially light tight structure when in its closed position with respect to the marginal edges of the eye shield.

While mechanisms proposed heretofore have satisfied to a considerable extent the first two of the above considerations, the problem of light leakage when the eye shield is in its operated position to shield the wearer's eyes has still been a problem.

With the foregoing in mind, it is a primary object of this invention to provide an improved eye shield actuating means responsive to movement of a welder's chin for moving an eye shield out of the welder's line of vision so that his hands will be free during all steps of the welding operation, which mechanism insures a substantially light-proof structure when the eye shield means is in its closed or in-line-of-vision position.

Other important objects of this invention are to provide a mechanism of the foregoing type which is simple, reliable in operation, capable of effecting relatively large movement of the eye shield in response to a relatively small movement of the wearer's chin, and which does not present undue obstructions within the interior of the hood.

Briefly, these and other objects and advantages of this invention are attained by providing a relatively flat front supporting frame structure adapted to be removably secured to the inside front wall of a conventional welding hood. This frame structure includes mounting means in the form of channels for guiding opposite edges of a suitable eye shield for movement from a first position in the line of vision of a wearer to a second position out of the line of vision of the wearer. The guiding channels include felt lining to insure a light-proof structure.

Cooperating with the eye shield are a pair of coupling members pivoted to the front supporting frame and arranged to be actuated through suitable pull rods. A chin operated structure in turn is pivoted to the lower inside portion of the front frame and coupled by suitable actuating mechanism to the pull rods in such a manner that depression of the chin operated structure will result in a greatly mechanically amplified movement of the coupling members in a manner to slide the eye shield from its in-line-of-vision position to a position free of the line of vision of the wearer.

A better understanding of the invention as well as further advantages and features thereof will be had by referring to the accompanying drawings, in which.

Figure 1:
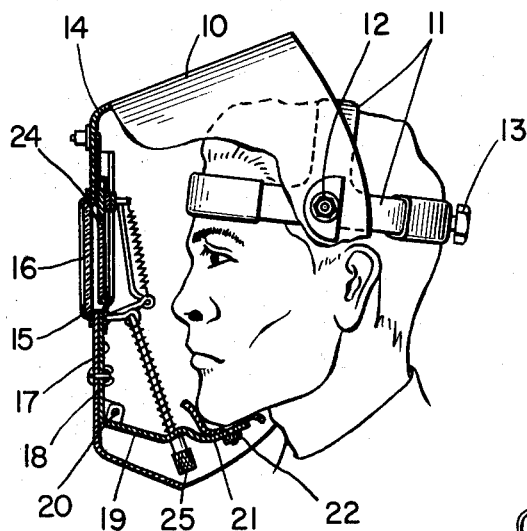
FIGURE 1 is a side view partly in cross section showing the welding helmet mechanism of this invention.

Referring first to FIGURE 1, there is shown a welding hood 10 provided with the conventional headband structure 11 pivoted at 12 to the hood so that the hood may be swung from a position in front of the wearer's face to a position over his head. An adjustment knob 13 may be provided at the rear of the headband for adjusting the circumference thereof to fit a particular wearer's head. The front wall 14 of the hood 10 includes the conventional window frame 15 supporting a glass window 16.

Within the interior of the hood, there is provided a front frame structure 17 removably secured to the inside of the front wall 14 of the hood as by a simple turn screw mechanism 18. With this arrangement, the screw 18 may be rotated a quarter of a turn to permit the frame structure to be removed from the inside of the helmet for servicing or replacement.

As shown in FIGURE 1, there is also included a chin operated structure 19 pivoted to the lower end of the front frame 17 as at 20. The structure 19 extends rearwardly within the hood to terminate in a chin rest 21 which may be suitably adjusted in a forward or rear direction by an adjustment screw 22. The arrangement is such that the wearer, by lowering his chin, may depress the chin operated structure to rotate the structure about the pivot 20 in a clockwise direction as viewed in FIGURE 1.

The foregoing motion is arranged to be communicated through a suitable actuating means including an actuating rod 23 coupled to the helmet eye shield 24 through suitable coupling members. An adjustment screw 25 at the lower end of the actuating rod 23 below the chin operated structure 19 enables an up and down adjustment of the chin rest 21 to be made in accordance with the position of the wearer's chin such that minimum movement of the wearer's chin is required to exert a downward force on the actuating rod 23.

Figure 2:
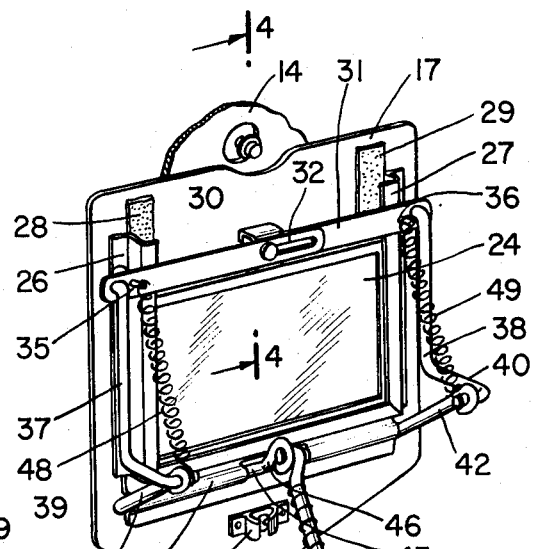
FIGURE 2 is an enlarged perspective view of the eye shield and operating mechanism therefor with the eye shield in a down or normal position in the line of vision of the wearer.

Referring now to FIGURE 2, the actuating mechanism and coupling means for moving the eye shield 24 of FIGURE 1 will become clearer. As shown, there are provided vertical channel members 26 and 27 secured to the frame 17 on opposite sides of the window for the eye shield. These channels are lined with felt pads 28 and 29 to engage the opposite edges of the eye shield 24 and insure absolute light tightness during sliding movement of the eye shield along the channels from the position shown in FIGURE 2 to the position shown in FIGURE 3.

Actual movement of the eye shield 24 between these first and second positions is accomplished by a pair of coupling members 30 and 31 having end slots 32 and 33 in overlapping registered relationship such that both will receive a pin 34 secured to the upper frame portion of the eye shield 24. The opposite ends of the members 30 and 31 in turn are pivoted at 35 and 36 to the front frame 17. A pair of pull rods 37 and 38 have their upper ends secured to the extreme ends of the members 30 and 31 adjacent to the respective pivots 35 and 36 so that a very short moment arm is provided. With this arrangement, a slight downward movement of the pull rods 37 and 38 will result in a relatively large arcuate swinging of the end portions of the members 30 and 31.

As shown in FIGURE 2, the pull rods 37 and 38 extend downwardly and hence rearwardly in bent portions 39 and 40 to connect to cooperating ends 41 and 42 of a horizontal rod 43. The rod 43 is parallel to the lower edge of the window opening and is journaled to the front frame 17 by suitable sleeves 44 and 45. The rod 43 includes a centrally rearwardly extending lever element 46 coupled at 47 to the upper end of the actuating rod 23.

Springs 48 and 49 may be provided between the coupling points of the bent portions 39 and 41 and 40 and 42 respectively, and the pivot points 35 and 36.

Figure 3:
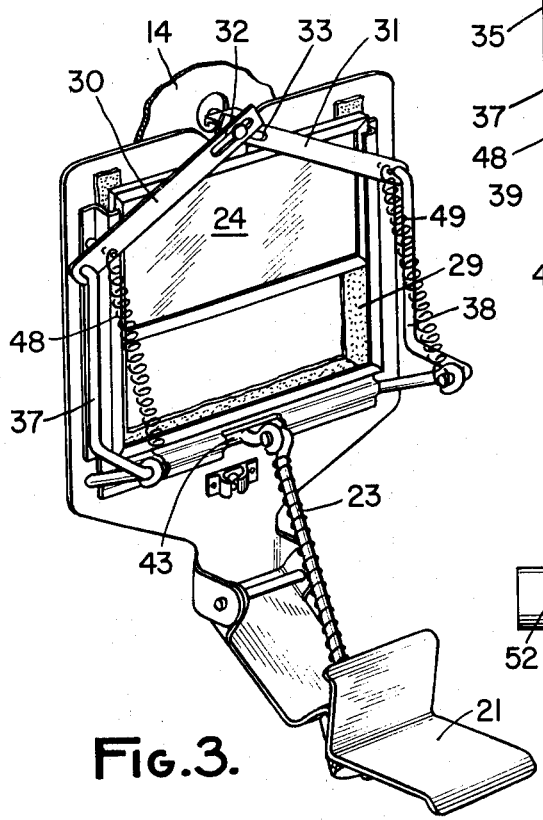
FIGURE 3 is a view similar to FIGURE 2 but showing the eye shield in a second position out of the line of vision of the wearer.

The operation of the foregoing structure will be evident by referring to both FIGURES 2 and 3 together. The springs 48 and 49 will initially exert a generally upward force on the pull rods 37 and 38 thereby tending to hold the coupling members 30 and 31 in a downward or horizontal position as shown in FIGURE 2. The eye filter 24, because of its connection to the pin 34, will therefore be held in a downward or in-line-of-vision position. The felt lining pads 28 and 29 within the channels 26 and 27 will prevent any light leakage around the marginal edges of the eye filter.

If now the wearer depresses his chin to depress the chin rest 21, this motion will be transmitted through the actuating rod 23 and centrally extending lever 46 to rotate within the journals 44 and 45 the horizontal rod 43. Rotation of this rod in turn will move its bent ends 41 and 42 downwardly to in turn pull the pull rods 37 and 38 downwardly and thereby pivot the coupling members 30 and 31 from the position shown in FIGURE 2 to the position shown in FIGURE 3. The pin 34 protruding through the registered slots 32 and 33 will thus be cammed upwardly thereby sliding the eye shield 24 upwardly to the position shown in FIGURE 3. Because of the mechanical sequence of events as described, it will be clear that a large mechanical amplification of the chin rest movement is achieved so that very little movement of the wearer's chain is required to move the eye shield from the first position shown in FIGURE 2 to the second or out-of-line-of-vision position shown in FIGURE 3. When the wearer releases pressure on the chin rest, the springs 48 and 49 will pull the coupling members 30 and 31 downwardly and thus the eye shield 24 will be moved back to the position shown in FIGURE 2.

In many instances, the welder may wish to maintain the eye shield in an upward position as shown in in FIGURE 3 without constantly exerting pressure by his chin. Towards this end, there may be provided a simple holding means as shown in the various drawings and particularly in the enlarged cross sectional view of FIGURE 4. As shown, this structure includes an attachment plate 50 for securement to the front wall 14 of the welding hood. The plate 50 includes a cylindrical guide tube 51 receiving a push button 52 narrowing into a reduced diameter shaft 53 passing through the front wall 14 to terminate in an end 54 arranged to engage under a small hook 55 secured to the upper edge of the eye shield 24.

Figure 4:
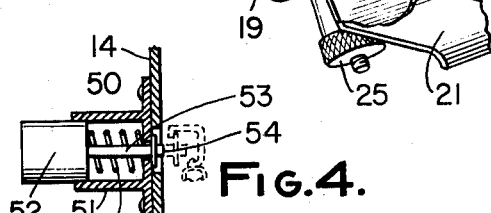
FIGURE 4 is a fragmentary cross section taken in the direction of the arrows 4—4 of FIGURE 2.

A spring 56 normally biases the button 52 to the outward or solid line position shown in FIGURE 4.

In the operation of the holding device shown in FIGURE 4, when the eye shield is moved from the solid line position corresponding to that of FIGURE 2 to the dotted line position in FIGURE 4, the end 54 may be secured under the hook 55 by manually depressing the button 52. If the wearer then relaxes pressure on the chin rest, the hook 54 will exert a downward force on the end of the shaft 53 and hold the shaft notwithstanding the bias of spring 56. Thus, the eye shield is locked in an upward position.

When the wearer wishes to release the eye shield, he need only apply pressure to the chin rest to raise the eye shield slightly through a distance sufficient to permit the spring 56 to return the end of the shaft 53 from under the hook 55. The eye shield may then drop downwardly to the closed position shown in FIGURE 2.

From the foregoing specification, it will be evident that the present invention has provided a greatly improved mechanism for enabling simple movement of an eye shield from the wearer's line of vision to a position out of the wearer's line of vision to enable inspection of a work without having to lift the entire welding hood from the wearer's face. Moreover, by employing the sliding eye shield type structure as set forth, substantially lightproof operation is insured.

Minor modifications that fall clearly within the scope and spirit of this invention will occur to those skilled in the art. The improved welding helmet is therefore not to be thought of as limited to the exact embodiment set forth merely for illustrative purposes.

What is claimed is:

1. In combination with a protective hood, a front frame; eye shield means; mounting means mounting said eye shield means to said frame for sliding movement in its own plane from a first position in the line of vision of a wearer to a second raised position out of said line of vision; chin operated structure pivoted to said front frame and positioned to be depressed by a wearer's chin; a pair of coupling members having their outer end portions pivoted to said front frame and having their inner end portions overlapping, said inner portions including registering slots, said eyeshield means including a central upper pin extending through said slots to couple said members to said eye shield means; pull rods connected at their upper ends to the outer ends of said members at points spaced outside the points of pivoting of said members to said frame so that a force moment arm is defined for swinging said coupling members to cause said slots to cam against said pin to move said eye shield means from said first to said second position upon downward movement of said pull rods; and actuating means coupling the lower ends of said pull rods to said chin operated structure to pull said pull rods downwardly when said chin operated structure is depressed whereby said eye shield means is movable by said wearer's chin.

2. In combination with a protective hood, a front frame supporting a single eye shield; a pair of coupling members having their outer end portions pivoted to said frame and their inner end portions overlapping, said inner end portions including registering slots, said eye shield including a central upper pin extending through said slots to couple said members to said eye shield such that swinging movement of each coupling members cam said pin upwardly to move said eye shield in its own plane from a first position in the line of vision of a wearer to a second position out of said line of vision; pull rods for said coupling members having their upper ends coupled to the far ends of said coupling members at points spaced a given distance outside the pivot points of said coupling members so that a force moment arm is defined for swinging said coupling members upwardly to move said eye shield from said first to said second position upon downward movement of said pull rods, the lower ends of said pull rods terminating in rearwardly extending bent portions; and an acutating means coupled to said frame and said bent portions, said actuating means including a chin operated structure pivoted to said frame and positioned to be engaged by the wearer's chin, whereby depression of said structure actuates said actuating means to exert a pulling force on said pull rods and thereby swing said coupling members to move said eye shields to said second position.

3. The combination of claim 2, in which said actuating means includes a transverse rod rotatably mounted to said frame beneath said eye shields, said rod terminating in rearwardly bent ends coupled respectively to the said bent portions of said pull rods, and including a centrally extending lever; an actuating rod extending between said lever and said chin operated structure so that said depression of said structure pulls said actuating rod to swing said lever and thereby rotate said transverse rod to provide said pulling force on said pull rods.

4. The subject matter of claim 1, in which said mounting means includes vertical guide channels; and felt padding lining said channels whereby light is substantially blocked from passing into said hood except through said eye shield means when said eye shield means is in said first position.

References Cited in the file of this patent
UNITED STATES PATENTS

| | | |
|---|---|---|
| 1,854,272 | Norton | Apr. 19, 1932 |
| 1,877,024 | Norton | Sept. 13, 1932 |
| 2,339,280 | Madson | Jan. 18, 1944 |
| 2,416,764 | Madson | Mar. 4, 1947 |
| 2,546,942 | Doran | Mar. 27, 1951 |
| 2,569,715 | Green | Oct. 2, 1951 |
| 2,592,805 | Hutchinson | Apr. 15, 1952 |